(12) United States Patent
Shoji

(10) Patent No.: US 8,190,022 B2
(45) Date of Patent: May 29, 2012

(54) OPTICAL TRANSMISSION APPARATUS

(75) Inventor: Takuma Shoji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 12/338,328

(22) Filed: Dec. 18, 2008

(65) Prior Publication Data

US 2009/0169201 A1  Jul. 2, 2009

(30) Foreign Application Priority Data

Dec. 26, 2007 (JP) ................... 2007-334973

(51) Int. Cl.
*H04B 10/08* (2006.01)
*H04B 10/00* (2006.01)

(52) U.S. Cl. ................ 398/9; 398/79; 398/138

(58) Field of Classification Search ........... 398/9, 14, 398/25, 33, 34, 37, 79, 91, 93, 135, 138
See application file for complete search history.

(56) References Cited

U.S. PATENT DOCUMENTS 5,638,514 A   6/1997 Yoshida et al.
2003/0163555 A1* 8/2003 Battou et al. ............. 709/223

FOREIGN PATENT DOCUMENTS

| JP | 5-183634 | 7/1993 |
| JP | 6-164523 | 6/1994 |
| JP | 7-84941  | 3/1995 |
| JP | 2644886  | 5/1997 |

* cited by examiner

*Primary Examiner* — Kenneth N Vanderpuye
*Assistant Examiner* — Daniel Dobson
(74) *Attorney, Agent, or Firm* — Staas & Halsey LLP

(57) ABSTRACT

An optical transmission apparatus includes a network, a plurality of transponders, a monitor, a multiplexer, and demultiplexer. The plurality of transponders connected with the network, each of the plurality of transponders having a response transfer processing unit for communicating between the other transponders via the network, the plurality of transponders categorized a first transponder and a second transponder; The monitor connected with each of the transponder units, respectively, the monitor monitoring the plurality of transponders and sending a first request and a second request to the plurality of transponders. The first transponder responds an answer to the monitor via the network when the first transponder receives the first request. The second transponder responds an answer to the monitor instead of the first transponder via the network when the first transponder receives the second request.

11 Claims, 15 Drawing Sheets

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | 1 | 5 |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

FIG. 5

| SLOT NUMBER TO RESPOND TO SETTING REQUEST/ CONTROL INSTRUCTION | SLOT NUMBER RESPONDING TO INFORMATION COLLECTION REQUEST |
|---|---|
| 1 | 3 |

FIG. 6

| SLOT NUMBER TO RESPOND TO SETTING REQUEST/ CONTROL INSTRUCTION | SLOT NUMBER RESPONDING TO INFORMATION COLLECTION REQUEST |
|---|---|
| 1 | 3 |

FIG. 7

| SLOT NUMBER TO RESPOND TO SETTING REQUEST/ CONTROL INSTRUCTION | SLOT NUMBER RESPONDING TO INFORMATION COLLECTION REQUEST |
|---|---|
| 1 | 5 |

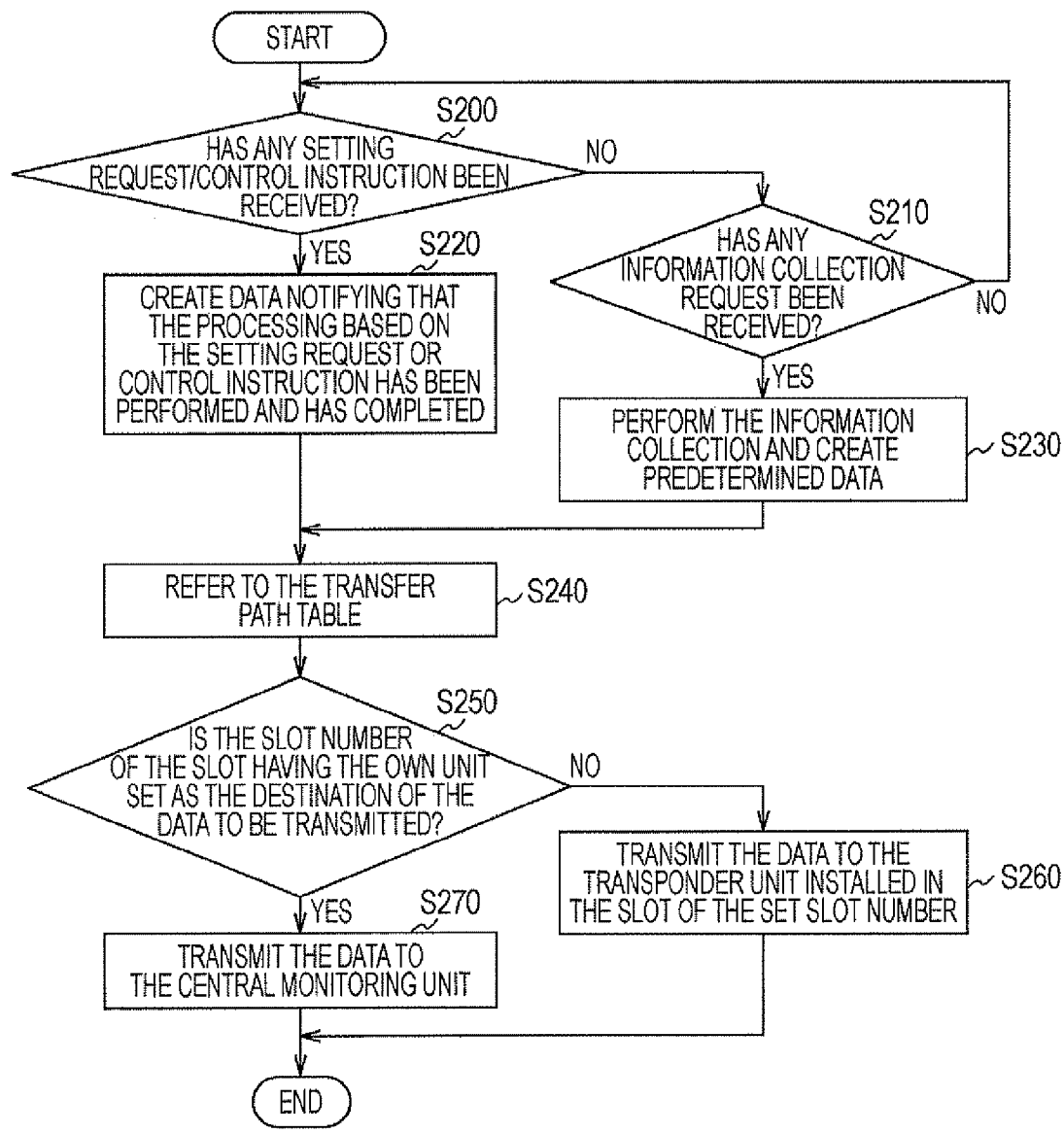

FIG. 17

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | 1 | 5 |
| 7 | 1 | 7 |
| 9 | NONE | NONE |
| 11 | 1 | 11 |
| 13 | 1 | 13 |
| 15 | 1 | 15 |
| 17 | 1 | 17 |
| 19 | 1 | 19 |

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | 1 | 5 |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

B

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | NONE | NONE |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | 1 | 5 |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

B

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | NONE | NONE |
| 3 | 3 | 5 |
| 5 | 3 | 5 |
| 7 | 3 | 7 |
| 9 | NONE | NONE |
| 11 | NONE | NONE |
| 13 | 3 | 13 |
| 15 | 3 | 15 |
| 17 | 3 | 17 |
| 19 | 3 | 19 |

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 3 |
| 3 | 1 | 3 |
| 5 | 1 | 5 |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

B

| SLOT NUMBER | SLOT NUMBER TO RESPOND TO SETTING REQUEST/ CONTROL INSTRUCTION | SLOT NUMBER RESPONDING TO INFORMATION COLLECTION REQUEST |
|---|---|---|
| 1 | 1 | 5 |
| 3 | NONE | NONE |
| 5 | 1 | 5 |
| 7 | 1 | 7 |
| 9 | NONE | NONE |
| 11 | NONE | NONE |
| 13 | 1 | 13 |
| 15 | 1 | 15 |
| 17 | 1 | 17 |
| 19 | 1 | 19 |

OPTICAL TRANSMISSION APPARATUS

CROSS-REFERENCE TO RELATED APPLICATION

This application is based upon and claims the benefit of priority of the prior Japanese Patent Application No. 2007-334973, filed on Dec. 26, 2007, the entire contents of which are incorporated herein by reference.

FIELD

The embodiments discussed herein are related to an optical transmission apparatus for transmitting optical signals.

BACKGROUND

Hitherto, in an optical transmission apparatus that multiplexes optical signals through a transponder (WDM: Wavelength Division Multiplexing). The optical transmission apparatus has a monitoring unit that monitors operations of transponder units. The monitoring unit controls the optical transmission apparatus.

More specifically, the monitoring unit requests a provisioning and/or a controlling on the base of a control instruction (Control) to the optical transmission apparatus directly from user's operation or an NMS (Network Management System) indirectly through, for example.

The optical transmission apparatus notifies a user of information collection on alarming (e.g. Condition of System) and PM (Performance), for example, occurring in units therein. The monitoring unit and the transponder units have interfaces, respectively. The monitoring unit transmits the request by the user to the transponder units by the use of the interface. Moreover, the monitoring unit sends and receives information to the transponder units or from the transponder units.

For example, when the monitoring unit receives a setting request (Provisioning) or a control instruction (Control) from a user the monitoring unit notifies the target transponder unit of the request/instruction. The target transponder unit after the completion of the requested/instructed processing returns a request response/instruction response to the monitoring unit, and the monitoring unit notifies the processing result to the user.

Similarly, for the information collection on alarming and/or PM, the monitoring unit periodically notifies an information collection request to the transponder units. Each of the transponder units in response thereto collects information and notifies it to the monitoring unit. Then, the monitoring unit notifies the result of the information collection to a user as required.

However, in recent years, faster responses have been demanded to setting requests and control instructions from a user. There is a tendency that the amount of collection increases due to the increase in number of targets for information collection and the increase in the number of items. In particular, because a mesh configurable unit that directly communicates with an arbitrary transponder unit may further collect information on other units in addition to the own unit and notifies the result to the monitoring unit, the enormous amount of information is to be collected.

For those reasons, cases have occurred where the processing for a setting request or a control instruction from a user may delay due to the incompletion of the information collection processing. Because the amount of delay increases as the number of units increase, significantly large delay may occur in mesh-configurable units in which operations by multiple units are assumed.

Accordingly, a method has been conventionally applied including preparing a central monitoring system and collecting information by the central monitoring system, as illustrated in Japanese Laid-Open Patent Publication No. 06-164523, for decreasing the time for data collection by an intensive monitoring device.

However, with the prior art, though the data collection time between the intensive monitoring device and the central monitoring system decreases, the data collection time between NE (Network Equipment) and the central monitoring system does not decrease. Because the prior art is for a network of multiple NE, the central monitoring system may be deployed between the intensive monitoring device and the NE. However, the deployment of a system specially for information collection between a monitoring unit and a transponder unit may require an extra space, which is a problem.

In other words, in a case where multiple transponder units are still implemented in a mesh configuration at all times, the time for collecting information from transponder units by a monitoring unit increases. Therefore, the execution of a request or instruction with high priority by a user may be delayed by information collection processing with low priority, which is another problem.

SUMMARY

According to an aspect of the invention, an optical transmission apparatus includes a network, a plurality of transponders, a monitor, a multiplexer, and a demultiplexer The plurality of transponders is connected with the network, each of the plurality of transponders having a response transfer processing unit for communicating between the other transponders via the network, the plurality of transponders categorized a first transponder and a second transponder. The monitor is connected with each of the transponder units, respectively, the monitor for monitoring the plurality of transponders and for sending a first request and a second request to the plurality of transponders. The multiplexer is connected with the plurality of transponders, the multiplexer for multiplexing signals from the plurality of transponders. The demultiplexer connected with the plurality of transponders, the demultiplexer providing demultiplexing signals to each of the plurality of transponders. The first transponder responds an answer to the monitor via the network when the first transponder receives the first request. The second transponder responds an answer to the monitor instead of the first transponder via the network when the first transponder receives the second request.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating an example of information stored on a transfer path table that a transponder unit 50A1 includes.

FIG. 6 is a diagram illustrating an example of information stored on a transfer path table that a transponder unit 50A2 includes.

FIG. 7 is a diagram illustrating an example of information stored on a transfer path table that a transponder unit 50A3 includes.

FIG. 8 is a flowchart for illustrating processing operations by a monitoring response transfer processing operation.

FIG. 17 is a diagram for illustrating the reset to be performed for the addition of a transponder unit.

FIG. 18 is a diagram for illustrating the reset to be performed due to the deletion or malfunction of a transponder unit.

FIG. 19 is a diagram for illustrating the reset to be performed due to the deletion or malfunction of a transponder unit.

FIG. 20 is a diagram for illustrating the reset to be performed due to the deletion or malfunction of a transponder unit.

DESCRIPTION OF EMBODIMENTS

With reference to the attached drawings, embodiments of an optical transmission apparatus according to the present invention will be described in detail below.
Embodiment 1

Figure 1:
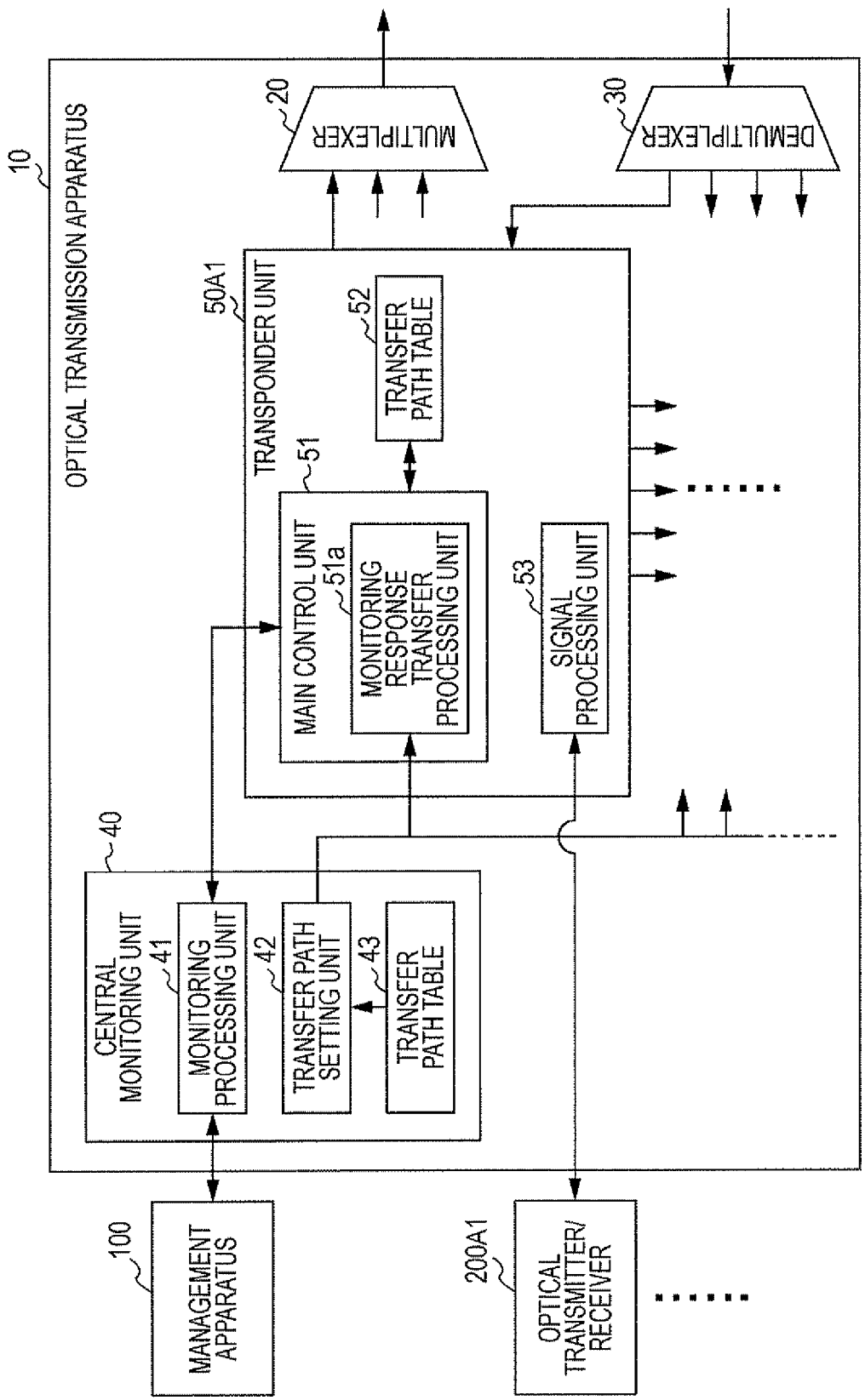
FIG. 1 is a diagram for explaining an outline and configuration of an optical transmission apparatus according to Embodiment 1.

FIG. 1 is a diagram for explaining an outline and configuration of an optical transmission apparatus according to Embodiment 1. First of all, with reference to the FIG. 1, an outline of the optical transmission apparatus will be described.

An optical transmission apparatus 10 includes a multiplexer 20, a demultiplexer 30 and multiple transponder units 50A1 to 50An. The optical transmission apparatus 10 forms a core transmission path for optical signals along with other optical transmission apparatus, not shown, on the basis of the functions of the components, and may output signals from multiple optical transmitters/receivers (such as a router) connecting to the own apparatus to the core transmission path and/or capture and transmit an optical signal having passed through the core transmission path to an optical transmitter/ receiver.

The optical transmission apparatus 10 includes a central monitoring unit 40 and controls accesses from the management apparatus 100 connecting to the own apparatus.

The management apparatus 100 initializes or changes the setting in operation of the optical transmission apparatus. The initialization or change in setting is specifically for a transponder unit, and the management apparatus 100 transmits a setting request (Provisioning) or a control instruction (Control) to the optical transmission apparatus 10.

The central monitoring unit 40 receives the setting request or control instruction and notifies it to a target transponder unit The processing according to the setting request or control instruction is performed in the transponder unit, and the central monitoring unit 40 in response to the notification of completion of the processing responds to the management apparatus 100. The signal processing by the optical transmission apparatus 10 is performed on the basis of the setting of or control over the transponder unit.

In the embodiment, the transponder is an interface unit for receiving downstream signal from a downstream and upstream signal from an upstream, and for transmitting the downstream signal to the upstream and the upstream signal to the downstream. The transponder may includes a protocol interface function for example SONET(OC3/OC12/OC48/ OC192/OC768), 1GE/10GE(LANPHY/WANPHY), a signal changing function as a Degital Wrapper, a redundant system function for making a hot-standby system.

Describing the flow of the signal processing, a signal processing unit 53 of the transponder unit 50A1 converts a signal received from the optical transmitter/receiver 200A1 to an optical signal for wavelength multiplexing and input the result to the multiplexer 20.

Then, the multiplexer 20 multiplexes an optical signal from the transponder units 50A1 and optical signals from the other transponder units, and transmits the result to the other optical transmission apparatus.

On the other hand, the demultiplexer 30 demultiplexes the multiplexed signal transmitted by another optical transmission apparatus into optical signals in corresponding wavelengths and inputs them to the transponder units.

The signal processing unit 53 of the transponder unit 50A1 converts an optical signal input from the demultiplexer 30 to a signal for an optical transmitter/receiver and may transmit the result to the optical transmitter/receiver 200A1.

Figures 2, 3:
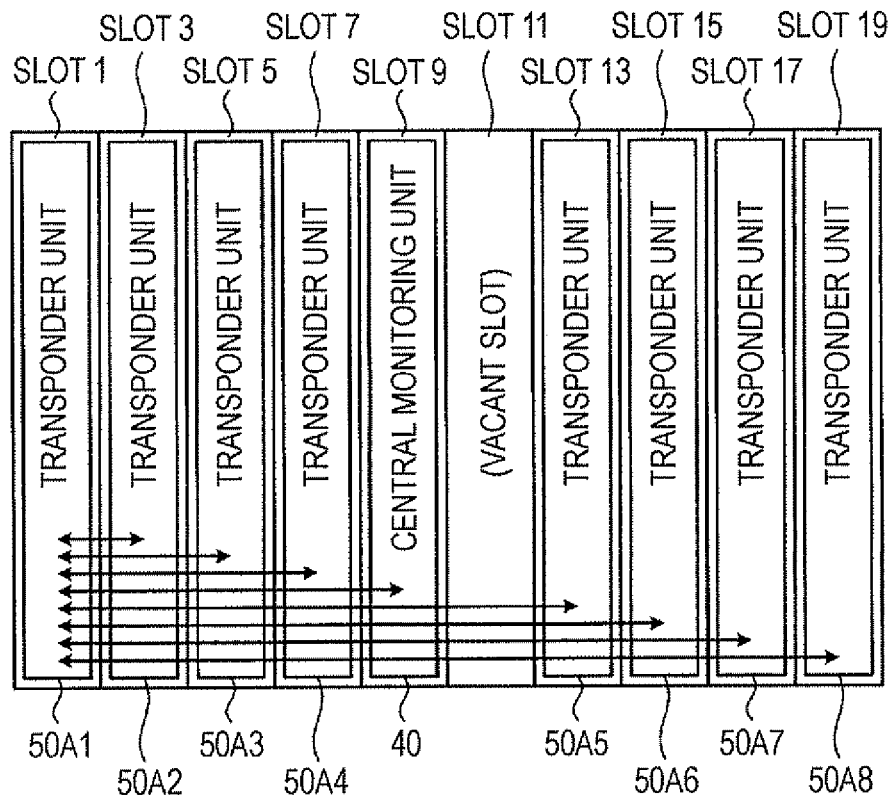
FIG. 2 is a diagram illustrating a state that a central monitoring unit and transponder units are inserted to slots.
FIG. 3 is a diagram illustrating an example of information stored on a transfer path table that the central monitoring unit includes.

By the way, the optical transmission apparatus 10 has multiple slots to which the central monitoring unit 40 or the transponder units 50A1 to 50A8 are to be inserted, as shown in FIG. 2. In FIG. 2, the optical transmission apparatus 10 can actually accept the installation of eight transponder units.

A user can insert the central monitoring unit 40 and/or transponder units 50A1 to 50A8 to the slots arbitrarily. For example, the transponder unit 50A1 may be installed to Slot 1 under a slot number 1, and the central monitoring unit 40 may be installed to Slot 9. Slot 11 to which nothing are not inserted is a vacant slot.

The slots composing a storage unit are mutually connected by wires, not shown. The transponder units installed to the slots can also communicate with all transponder units installed to the other slots. Transponder units that can mutually communicate with all transponder units installed to the slots will be called mesh-configurable transponder units. Apparently, the central monitoring unit 40 installed to the slot can communicate with all of the transponder units.

For example, the transponder unit 50A1 can mutually communicate with the units installed in the slots as indicated by the bidirectional arrows in FIG. 2 connecting the own unit and the central monitoring unit 40 and the transponder units 50A2 to 50A8.

The description above is on the outline of the optical transmission apparatus, and the components composing the optical transmission apparatus 10 according to Embodiment 1 will be described below.

The central monitoring unit 40 is a processing unit that controls accesses to the optical transmission apparatus 10 by the management apparatus 100 and includes a monitoring processing unit 41, a transfer path setting unit 42 and a transfer path table 43, The monitoring processing unit 41 receives a setting request or control instruction to the optical transmission apparatus 10 from the management apparatus 100 and notifies the setting request or control instruction to the target transponder unit of the setting or control. After that, because a response indicating that the processing based on the setting or control has completed is returned from the target transponder unit, the monitoring processing unit 41 returns the response as the optical transmission apparatus 10 to the management apparatus 100.

The monitoring processing unit 41 performs information collection as a status in the transponder units, periodically. The monitoring processing unit 41 notifies an information collection request to the target transponder unit of information collection. Since predetermined data based on the information collection request is transmitted from the target transponder unit, the monitoring processing unit 41 receives the data and transmits it to the management apparatus 100.

The transfer path table 43 is a table on which information is stored during processing by the transfer path setting unit 42. More specifically, as shown in FIG. 3, the slot number of a slot (for example, the number given to "Slot" in FIG. 2 is a slot number) is preset on the transfer path table 43, and in connection with the slot number. The correspondence relationship between a slot number to respond to a setting request or control instruction and a slot number to respond to an information collection request is stored thereon. The slot number to respond to a setting request or control instruction refers to a slot number of a slot in which a transponder unit is installed, which is an aggregation end of responses to a setting request or control instruction. The slot number to respond to an information collection request refers to a slot number of a slot in which a transponder unit is installed, which responds to an information collection request.

Figure 4:
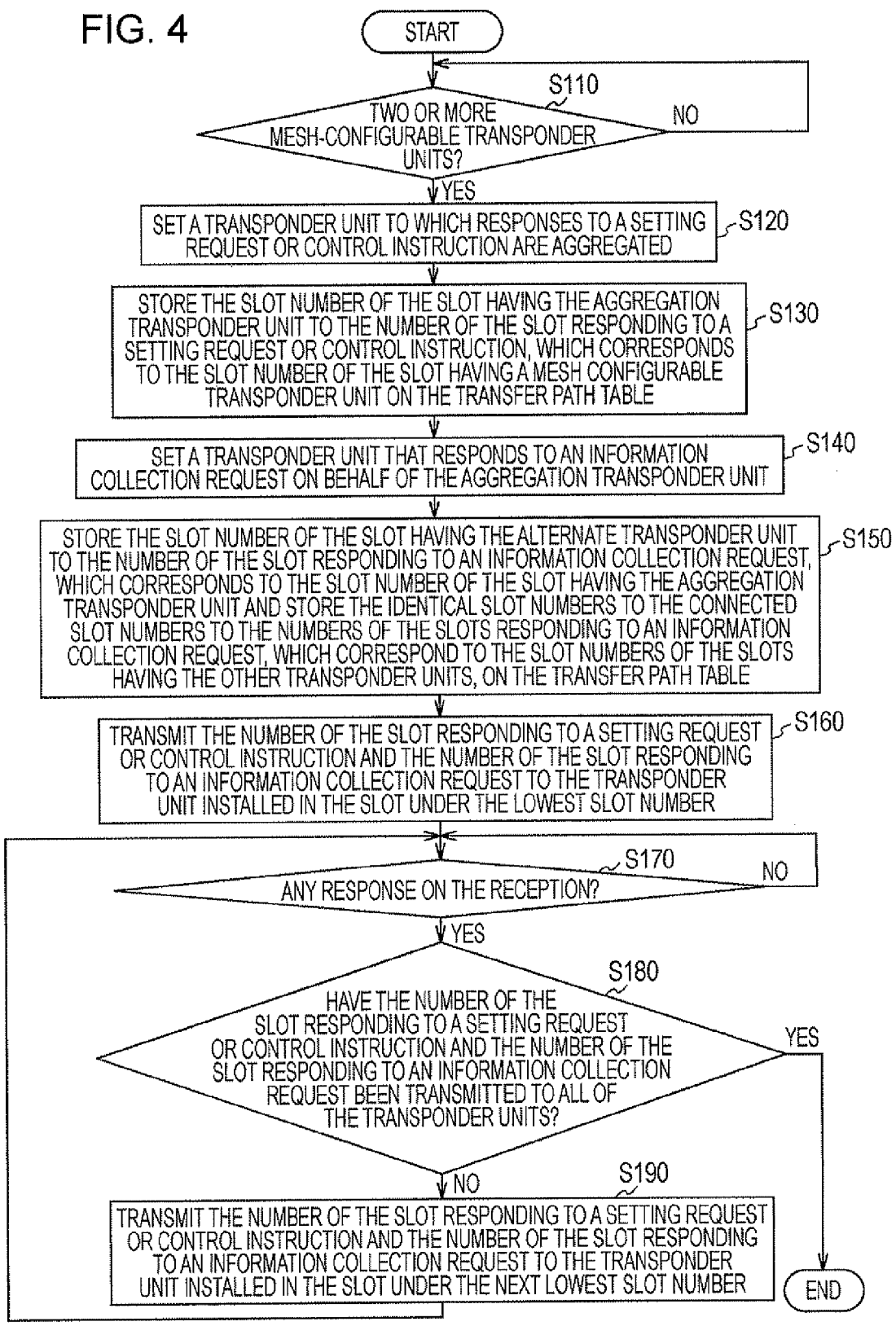
FIG. 4 is a flowchart for illustrating processing operations by a transfer path setting unit.

The transfer path setting unit 42 sets a transfer path by the monitoring response transfer processing unit 51a of each of the transponder units. The processing operations by the transfer path setting unit 42 will be described with reference to the flowchart in FIG. 4. FIG. 4 is a flowchart for describing processing operations by the transfer path setting unit 42, and the processing flow shown in the FIG. 4 is performed upon powering on the optical transmission apparatus 10.

First of all, if two or more mesh-configurable transponder units are recognized (Yes in step S110), the transfer path setting unit 42 sets a transponder unit to which responses to a setting request or control instruction are aggregated (step S120).

The methods for determining the aggregation transponder units may include determining the transponder unit installed in the slot under the lowest slot number as the aggregation transponder unit. For example, if the transponder units 50A1 to 50A8 are installed thereto as shown in FIG. 2, the transponder unit 50A1 installed in Slot 1 under the lowest slot number is determined as the aggregation end.

Then, the transfer path setting unit 42 stores the slot number of the slot having the aggregation transponder unit to the number of the slot responding to a setting request or control instruction, which corresponds to the slot number of the slot having a mesh configurable transponder unit on the transfer path table 43 (step S130).

Here, referring back to FIG. 3, the slot number "1" of Slot 1 having the transponder unit 50A1 is stored to the numbers of the slots responding to a setting request or control instruction corresponding to the slot numbers excluding slot numbers "9" and "11". It shows, as the specific example of step S120, the transfer path table 43 in a case where the transponder unit 50A1 is determined as the aggregation end among the transponder units 50A1 to 50A8 shown in FIG. 2.

Returning to the description on the processing operations, the transfer path setting unit 42 next sets a transponder unit that responds to an information collection request on behalf of the aggregation transponder unit (step S140).

The methods for determining the alternate transponder unit may include determining the transponder unit installed in the slot under the next lowest slot number as the alternate transponder unit. For example, the transponder unit 50A2 is determined as the alternate transponder unit in a case where the transponder units 50A1 to 50A8 are installed there in as shown in FIG. 2.

Then, on the transfer path table 43, the transfer path setting unit 42 stores the slot number of the slot having the alternate transponder unit to the number of the slot responding to an information collection request, which corresponds to the slot number of the slot having the aggregation transponder unit, and stores the identical slot numbers to the preset slot numbers to the numbers of the slots responding to an information collection request, which correspond to the slot numbers of the slots having the other transponder units (step S150).

Here, referring back to FIG. 3, the slot number "3" of Slot 3 having the transponder unit 50A2 is stored to the number of the slot responding to an information collection request, which corresponds to the slot number "1", and stores the identical numbers to the slot numbers to the numbers of the slots responding to an information collection request, which correspond to the slot numbers excluding the other slot numbers "9" and "11". It shows, as the specific example of step S140, the transfer path table 43 in a case where the transponder unit 50A2 is determined as the alternate transponder unit among the transponder units 50A1 to 50A8 shown in FIG. 2.

Returning back to the description on the processing operations, the transfer path setting unit 42 transmits the number of the slot responding to a setting request or control instruction and the number of the slot responding to an information collection request to the transponder unit installed in the slot under the lowest slot number (step S160).

For example, a case will be described where the transponder units 50A1 to 50A8 are installed as illustrated in FIG. 2 and information as illustrated in FIG. 3 is stored on the transfer path table 43. The transfer path setting unit 42 transmits the number "1" of the slot responding to a setting request or control instruction and the number "3" of the slot responding to an information collection request to the transponder unit 50A1 installed in Slot 1.

Returning to the description on the processing operations, if the response on the reception is received from the destination transponder unit (Yes in step S170), the transfer path setting unit 42 checks whether the number of the slot responding to a setting request or control instruction and the number of the slot responding to an information collection request have been transmitted to all of the transponder units or not (step S180). If not (No in step S180), the transfer path setting unit 42 transmits the number of the slot responding to a setting request or control instruction and the number of the slot responding to an information collection request to the transponder unit installed in the slot under the next lowest slot number (step S190).

If the transmission of the slot numbers to all of the transponder units are completion (Yes in step S180), the transfer path setting unit 42 exits the processing.

Next, the transponder units 50A1 to 50An will be described. The transponder units 50A1 will be described as a representative of the transponder units.

The transponder unit 50A1 includes a main control unit 51, a transfer path table 52 and a signal processing unit 53. The description on the signal processing unit 53 referred in the description on the outline of the optical transmission apparatus 10 will be omitted.

The main control unit 50 is a processing unit that entirely controls the transponder unit 50A1 and includes a monitoring response transfer processing unit 50a, which is closely related to the present embodiment.

The monitoring response transfer processing unit 51a receives the output from the monitoring processing unit 41 of the central monitoring unit 40 or the output from the transfer path setting unit 42 and performs processing according to it.

First of all, if the number of the slot responding to a setting request or control instruction or the number of the slot responding to an information collection request is received from the transfer path setting unit 42, the monitoring response transfer processing unit 51a stores them to the transfer path table 52.

By the way, as a specific example in the description on the processing operations by the transfer path setting unit 42, the number "1" of the slot responding to a setting request or control instruction and the number "3" of the slot responding to an information collection request are transmitted to the transponder unit 50A1.

Thus, the number "1" of the slot responding to a setting request or control instruction and the number "3" of the slot responding to an information collection request are stored on the transfer path table 52, as illustrated in FIG. 5. As illustrated in FIG. 6, the number "1" of the slot responding to a setting request or control instruction and the number "3" of the slot responding to an information collection request, for example, may be stored on the transfer path table of the transponder unit 50A2, not illustrated. As illustrated in FIG. 7, the number "1" of the slot responding to a setting request or control instruction and the number "5" of the slot responding to an information collection request, for example, may be stored on the transfer path table of the transponder unit 50A3, not illustrated.

Next, with reference to the flowchart in FIG. 8, processing operations will be described in a case where the monitoring response transfer processing unit 51a receives a setting request, control instruction or information collection request from the monitoring processing unit 41. FIG. 8 is a flowchart for describing processing operations by the monitoring response transfer processing unit 51a, and the processing flow illustrated in the FIG. 8 is repeated when the optical transmission apparatus 10 is in operation.

If a setting request or control instruction is received from the monitoring processing unit 41 (Yes in step S200), the monitoring response transfer processing unit 51a creates data notifying that the processing based on the setting request or control instruction has been performed and has completed (step S220). Notably, the monitoring processing unit 41 determines the reception of the data as a response from the transponder unit.

If an information collection request is received from the monitoring processing unit 41 (Yes in step S210), the monitoring response transfer processing unit 51a performs the information collection and creates predetermined data including the collected information (S230).

After one of the data is created (step S220 or step S230), the monitoring response transfer processing unit 51a refers to the transfer path table 52 (step S240).

If the slot number of the slot having the own unit is set as the destination of the data to be transmitted (Yes in step S250), the monitoring response transfer processing unit 51a directly transmits the data to the central monitoring unit 40 (step S270).

If a different slot number is set as the destination (No in step S250) on the other hand, the monitoring response transfer processing unit 51a transmits the data to the transponder unit installed in the slot of the set slot number (step S260) and exits the processing.

By the way, by setting the transfer path as described above, data is transferred from the different transponder unit to the transponder unit determined as the aggregation transponder unit or the alternate transponder unit. In this case, the monitoring response transfer processing unit of the transponder unit further transfers the received data to the central monitoring unit 40.

The components of the optical transmission apparatus 10 have been described above. The communication which has been performed and the communication which is performed in this embodiment will be compared among the central monitoring unit 40 and the transponder units 50A1 to 50A3 selected among the units shown in FIG. 2 below.

Figure 9:
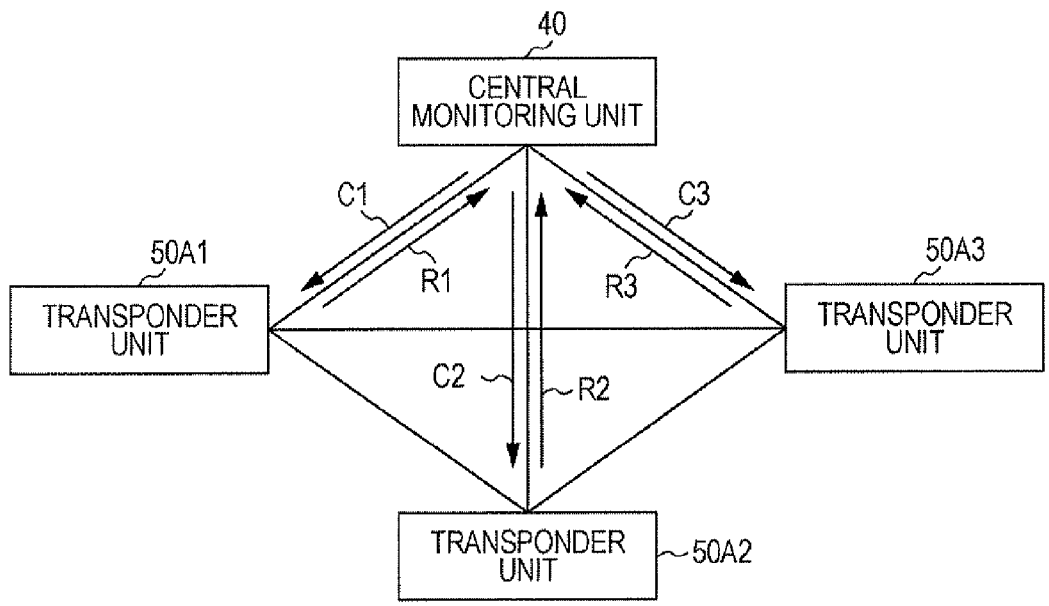
FIG. 9 is a diagram for illustrating an ordinary path for a response to a setting request/control instruction.

As illustrated in FIG. 9, the units have a state that all of the units can communicate with each other. If a setting request or control instruction transmitted by the central monitoring unit 40 is received (C1 to C3), the corresponding unit returns a response through the same path as the path for the reception (R1 to R3). Notably, FIG. 9 is a diagram for describing the ordinary path for a response to a setting request or control instruction.

Figure 10:
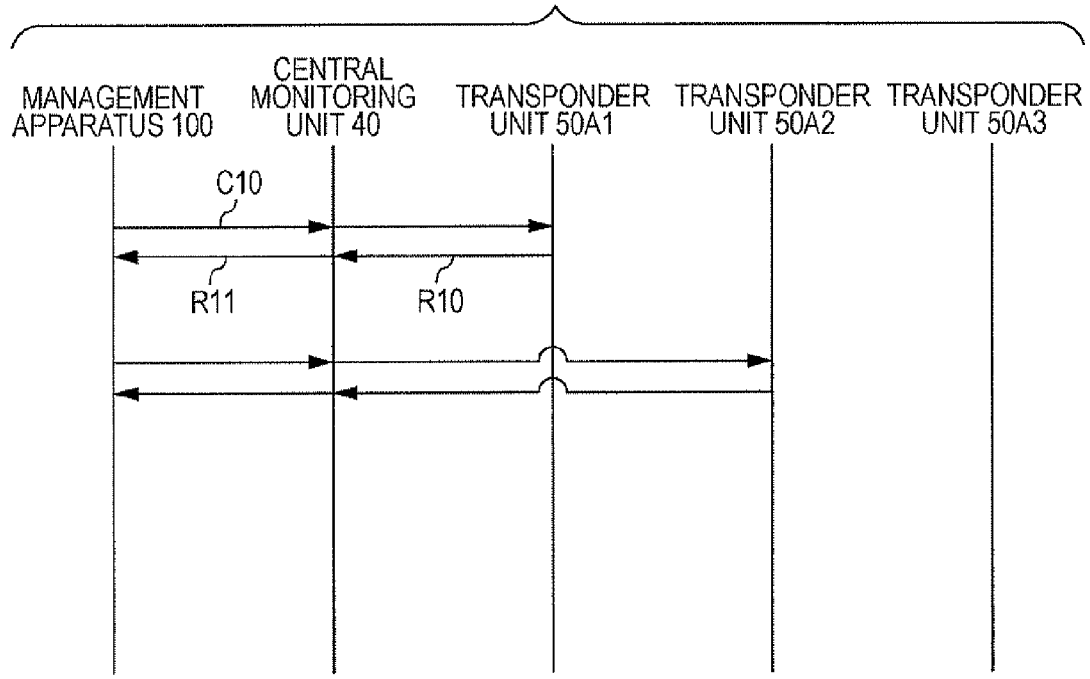
FIG. 10 is a diagram for illustrating an ordinary response to a setting request/control instruction performed within a certain period of time.

Next, with reference to FIG. 10, the communication to be performed by the units will be described in a time series manner. The lines extending downward from the components are time axes, and the time passes from the top to the bottom.

First of all, at the time indicated by the starting point of the arrow (C10), the management apparatus 100 starts the transmission of a setting request or control instruction for the transponder unit 50A1 to the central monitoring unit 40.

Then, at the time indicated by the end point of the arrow (C10), the central monitoring unit 40 ends the reception of the setting request or control instruction from the management apparatus 100.

Following the arrow, the transponder unit 50A1 soon receives the setting request or control instruction through the central monitoring unit 40. Then, after performing the processing based on the setting request or control instruction, the transponder unit 50A1 starts the transmission of the response at the time indicated by the starting point of the arrow (R10).

At the time indicated by the end point of the arrow (R10), the central monitoring unit 40 ends the reception of the response. Finally, at the time indicated by the end point of the arrow (R11), the management apparatus 100 receives the response through the central monitoring unit 40.

After that, the management apparatus 100 transmits a setting request or control instruction for the transponder unit 50A2 to the central monitoring unit 40. Because the processing by the components after that is the same as above, the description thereon will be omitted herein.

Figure 11:
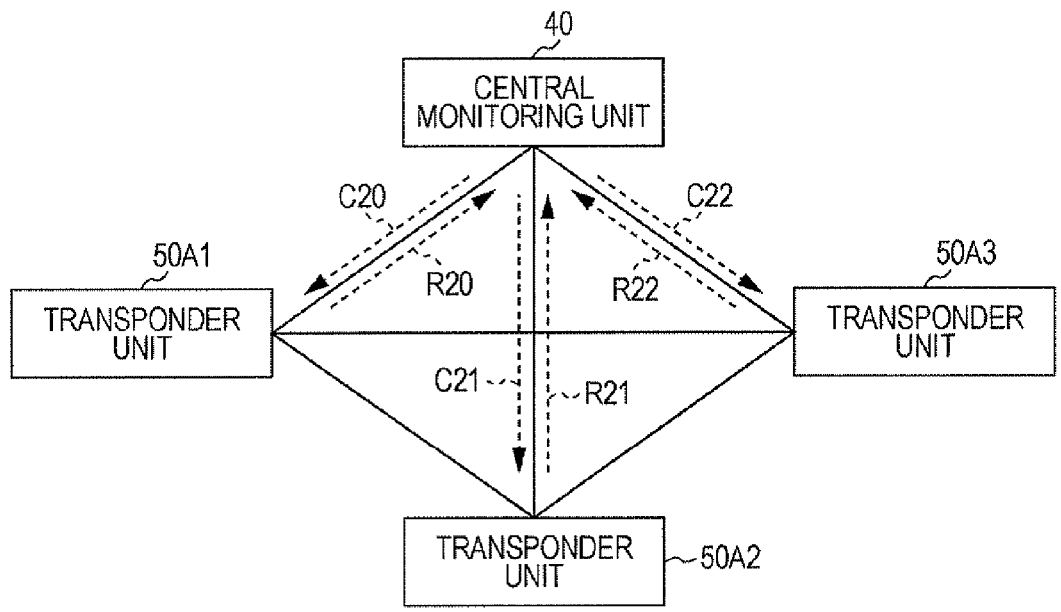
FIG. 11 is a diagram for illustrating an ordinary path for a response to an information collection request.

FIG. 11 is a diagram for describing an ordinary path of a response to an information collection request. As shown in the FIG. 11, if an information collection request transmitted by the central monitoring unit 40 is received (C20 to C22), the corresponding transponder unit returns a response through the same path as the path of the reception (R20 to R22).

Figure 12:
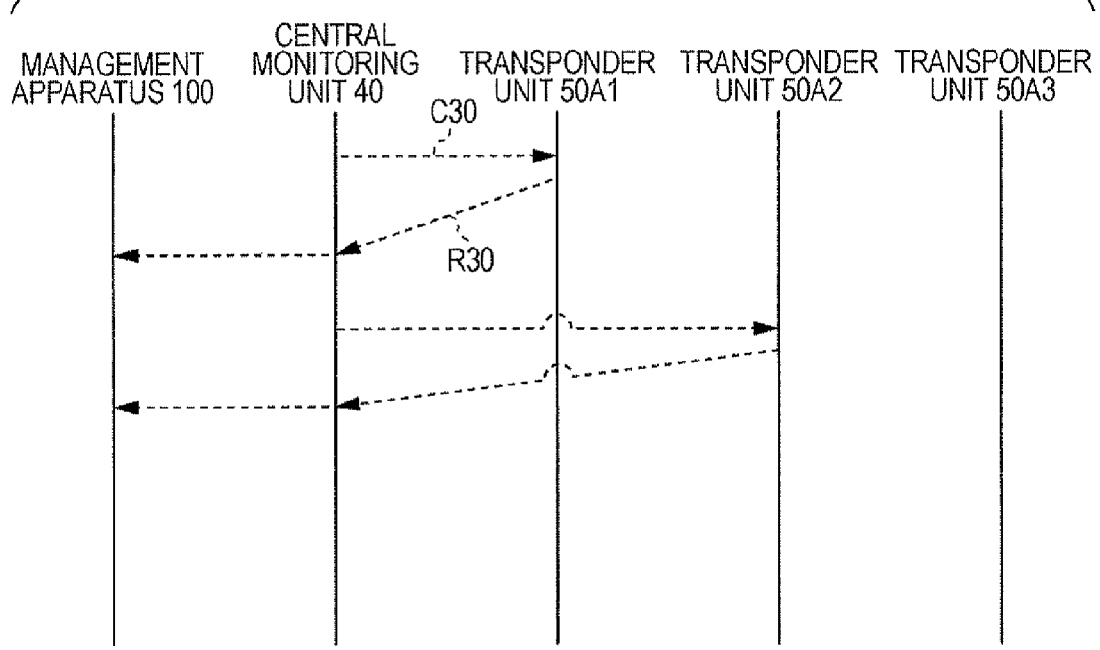
FIG. 12 is a diagram for illustrating an ordinary response to an information collection request, which is performed during a certain period of time.

With reference to FIG. 12, the communication to be performed by the units will be described also in a time series manner.

First of all, at the time indicated by the starting point of the dotted arrow (C30), the central monitoring unit 40 starts the transmission of an information collection request to the transponder unit 50A1.

Then, at the time indicated by the end point of the dotted arrow (C30), the transponder unit 50A1 ends the reception of the information collection request from the central monitoring unit 40.

The transponder unit 50A1 having received the information collection request performs the information collection and creates predetermined data. At the time indicated by the starting point of the dotted arrow (R30) after that, the transponder unit 50A1 starts the transmission of the data.

Then, at the time indicated by the end point of the dotted arrow (R30), the central monitoring unit 40 ends the reception of the data.

Here, the dotted arrow (R30) has a more unique gradient than those of the other arrows. In other words, because the amount of data created in accordance with the information collection request is large, the transponder unit 50A1 continuously transmits the data to the central monitoring unit 40 during the period from the starting point of the dotted arrow (R30) to the intersection of the time axis of the transponder unit 50A2 and the normal from the end point of the dotted arrow (R30) to the time axis. As a result, the communication path between the transponder unit 50A1 and the central monitoring unit 40 is occupied by the data, which delays the response to a setting request or control instruction.

Figure 13:
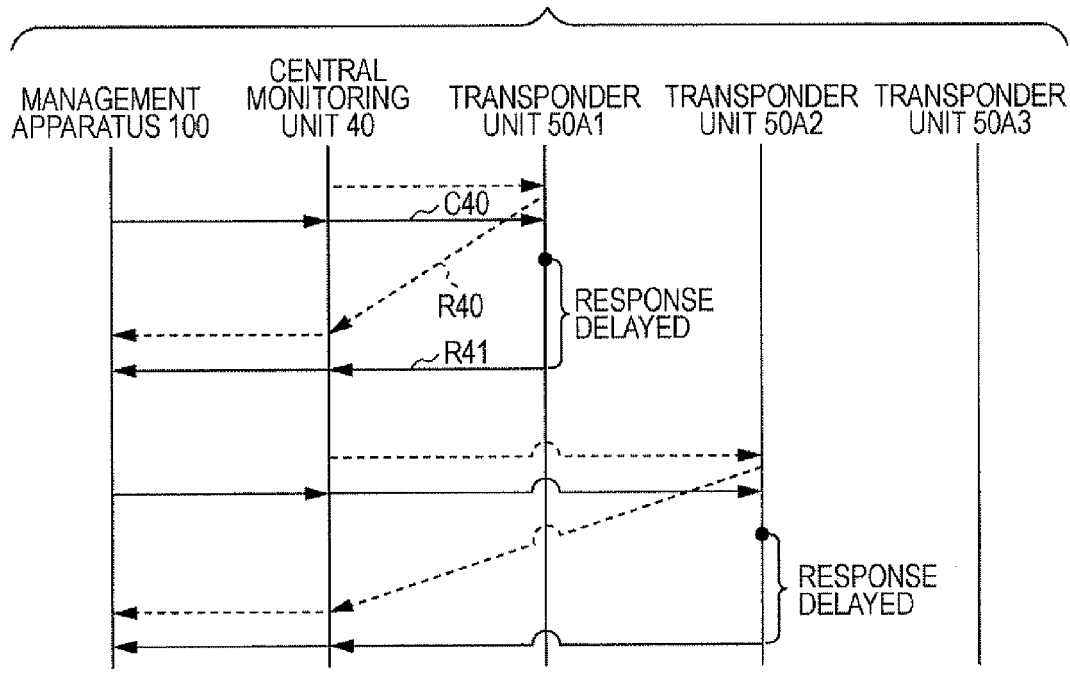
FIG. 13 is a diagram for illustrating a situation where the response to a setting request/control instruction is delayed.

FIG. 13 is a diagram for describing a situation where the response to a setting request or control instruction is delayed. As shown in the FIG. 13, the transponder unit 50A1 having received an information collection request from the central monitoring unit 40 performs the information collection, creates predetermined data and then starts the transmission of the data at the time indicated by the starting point of the dotted arrow (R40).

During the transmission of the data, the transponder unit 50A1 ends the reception of a setting request or control instruction at the time indicated by the end point of the solid arrow (C40). Then, the transponder unit 50A1 performs processing based on the setting request or control instruction.

However, the transponder unit 50A1 may not transmit the response though it can start the transmission of the response at the time indicated by the point below the end point of the solid arrow (C50) because the communication path between the own unit and the central monitoring unit 40 is occupied by the data being transmitted in accordance with the information collection request.

Therefore, the transponder unit 50A1 cannot help starting the transmission of the response at the time indicated by the starting point of the solid arrow (R41) after the completion of the transmission of the data.

In this way, the response by the transponder unit to a setting request or control instruction is delayed in the ordinary communication.

Figure 14:
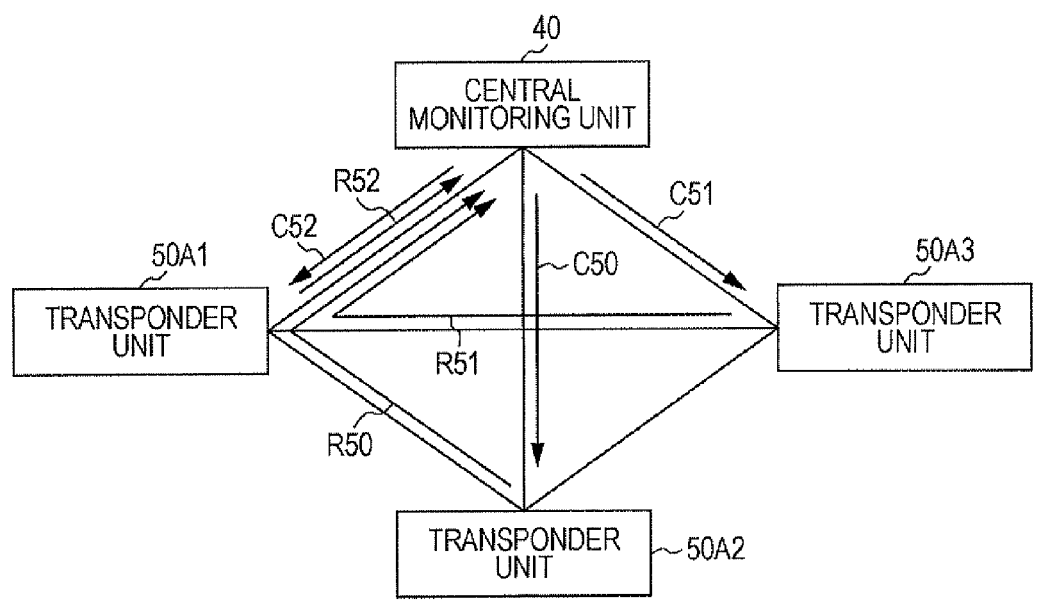
FIG. 14 is a diagram for illustrating the path of a response to a setting request/control instruction in this embodiment.

Returning to the embodiment 1 of the invention, as illustrated in FIG. 14, if a setting request or control instruction transmitted by the central monitoring unit 40 is received (C50 and C51), the transponder unit 50A2 and the transponder unit 50A3 return the responses through the path via the transponder unit 50A1 (R50 and R51). If a setting request or control instruction transmitted by the central monitoring unit 40 is received (C52), the transponder unit 50A1 returns a response through the same path as the path for the reception (R52).

Figure 15:
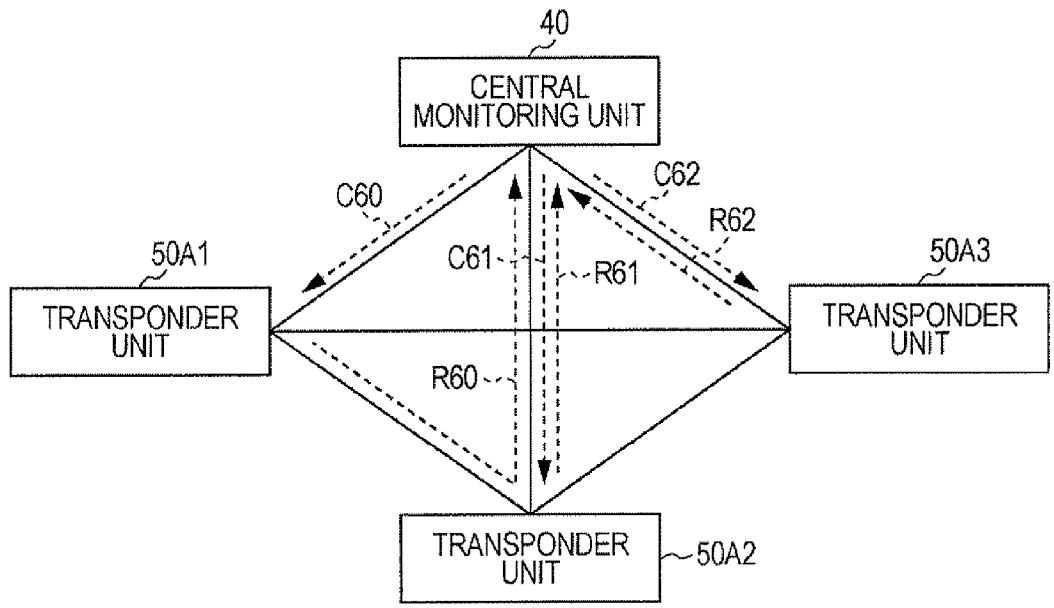
FIG. 15 is a diagram for illustrating the path of a response to an information collection request in this embodiment.

As illustrated in FIG. 15, if an information collection request transmitted by the central monitoring unit 40 is received (C60), the transponder unit 50A1 returns the response through the path via the transponder unit 50A2 (R60). If an information collection request transmitted by the central monitoring unit 40 is received (C61 and C62), the transponder unit 50A2 and the transponder unit 50A3 return a response through the same path as the path for the reception (R61 and R62).

Also with reference to FIG. 16, the communication performed by the each units of the embodiment will be described in a time series manner.

Figure 16:
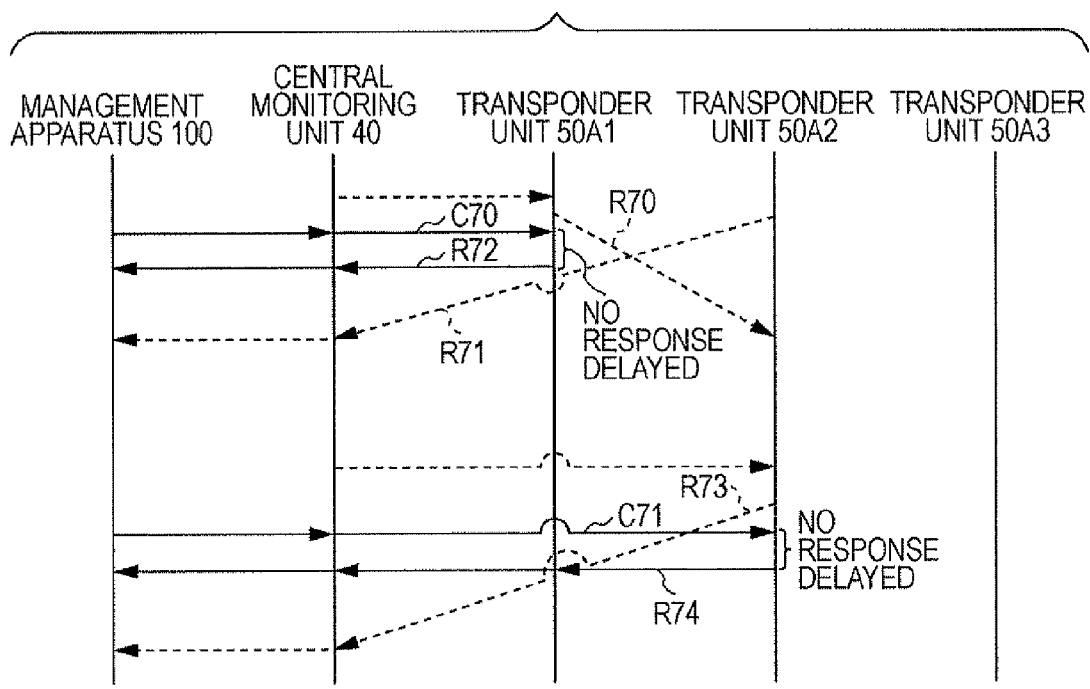
FIG. 16 is a diagram for illustrating that the delay of the response to a setting request/ control instruction does not occur.

As illustrated in the FIG. 16, the transponder unit 50Al having received an information collection request from the central monitoring unit 40 performs the information collection, creates predetermined data and then starts the transmission of the data to the transponder unit 50A2 at the time indicated by the starting point of the dotted arrow (R70).

The transponder unit 50A2 starts the transfer of the data to the central monitoring unit 40 at the time indicated by the starting point of the dotted arrow (R71).

Here, the transponder unit 50A1 ends the reception of a setting request or control instruction at the time indicated by the end point of the solid arrow (C70) during the transmission of the data. Because the communication path between the own unit and the central monitoring unit 40 is vacant in this embodiment, the transponder unit 50A1 can start the transmission of the response immediately at the time indicated by the starting point of the solid arrow (R72) after performing processing based on the setting request or control instruction.

The transponder unit 50A2 received an information collection request from the central monitoring unit 40 performs the information collection, creates predetermined data and then starts the transmission of the data to the central monitoring unit 40 at the time indicated by the starting point of the dotted arrow (R73).

Here, the transponder unit 50A2 ends the reception of a setting request or control instruction at the time indicated by the end point of the solid arrow (C71) during the transmission of the data.

Because the communication path between the own unit and the central monitoring unit 40 is in use, the transponder unit 50A2 can start the transmission of the response to the transponder unit 50A1 at the time indicated by the starting point of the solid arrow (R74) after performing processing based on the setting request or control instruction.

The transponder unit 50A1 received the response from the transponder unit 50A2 transfers the response to the central monitoring unit 40.

Comparing between FIG. 13 and FIG. 16, it is apparent that the time from the transmission of a setting request or control instruction to the reception of the response by the management apparatus 100 is shorter in FIG. 16 than the time in FIG. 13.

The description above is based on the four selected units and the comparison between communication which has been performed ordinary operation and communication which has been performed in this embodiment.

By the way, the optical transmission apparatus 10 is during in operation, a transponder unit may detach or insert from the optical transmission apparatus 10. A case where a transponder unit is to be added or deleted will be described below. Notably, the description assumes that the transponder units 50A1 to 50A8 are installed to the slots, the transponder unit 50A1 is determined as bunch of the aggregation transponder unit and the transponder unit 50A2 is determined as the alternate transponder unit, like the specific example referred in the description with reference to FIG. 2 and FIG. 4.

First of all, a case where a transponder unit is to be added to the slot will be described. Slot 11 among the slots illustrated in FIG. 2 is a vacant slot to which nothing is inserted.

Here, when a transponder unit is inserted thereto newly, the transfer path setting unit 42 updates the transfer path table 43 as shown in FIG. 17. In other words, "1" is stored to the number of the slot responding to a setting request or control instruction, which corresponds to the slot number "11", and "11" is stored to the number of the slot responding to an information collection request.

Then, the transfer path setting unit 42 transmits the number "1" of the slot responding to a setting request or control instruction and the number "11" of the slot responding to an information collection request.

Next, a case where a transponder unit is to be deleted from a slot will be described. If the already installed transponder unit 50A3, for example, is detached among the slots shown in FIG. 2, the transfer path setting unit 42 updates the transfer path table 43 as illustrated in FIG. 18. In other words, "1" is stored to the number of the slot responding to a setting request or control instruction, which corresponds to the slot number "5", and "5" is stored to the number of the slot responding to an information collection request on the table "A" in FIG. 18. After the update, both of the slot numbers are deleted as illustrated on the table "B" in FIG. 18. Because the transponder unit 50A3 is neither aggregation transponder unit nor alternate transponder unit, the transfer path table 43 is not further updated.

If the already installed transponder unit 50A1, for example, is detached among the slots illustrated in FIG. 2, the transfer path setting unit 42 updates the transfer path table 43 as illustrated in FIG. 19. In other words, "1" is stored to the number of the slot responding to a setting request or control instruction, which corresponds to the slot number "1", and "3" is stored to the number of the slot responding to an information collection request on the table "A" in FIG. 19. After the update, both of the slot numbers are deleted as illustrated on the table "B" in FIG. 19. Because the transponder unit 50A1 is the aggregation transponder unit, the transfer path table 43 is further updated.

Because the transponder unit 50A1 is the aggregation transponder unit, the transfer path setting unit 42 sets, as the aggregation transponder unit, the transponder unit 50A2 installed in Slot 3 under the next lowest slot number to that of Slot 1. Then, the transfer path setting unit 42 updates the number of the slot responding to a setting request or control instruction, which corresponds to the slot number of the slot having a mesh configurable transponder unit from "1" to "3", which is the slot number of the slot having the transponder unit 50A2 within the transfer path table 43.

Then, the transfer path setting unit 42 sets, for example, the transponder unit 50A3 installed in Slot 5 under the next lowest slot number to that of Slot 3 as the transponder unit that responses to an information collection request on behalf of the aggregation transponder unit. As a result, the transfer path setting unit 42 updates the number of the slot responding to an information collection request, which corresponds to the slot number "3" from "3" to "5" within the transfer path table 43.

If the already installed transponder unit 50A2, for example, is detached among the slots illustrated in FIG. 2, the transfer path setting unit 42 updates the transfer path table 43 as illustrated in FIG. 20. In other words, "1" is stored to the number of the slot responding to a setting request or control instruction, which corresponds to the slot number "3", and "3" is stored to the number of the slot responding to an information collection request on the table "A" in FIG. 20. After the update, both of the slot numbers are deleted as illustrated on the table "B" in FIG. 20. Because the transponder unit 50A2 is the alternate transponder unit, the transfer path table 43 is further updated.

Because the transponder unit 50A2 is the alternate transponder unit, the transfer path setting unit 42 sets the transponder unit 50A3 installed in Slot 5 under the next lowest slot number to that of Slot 3 as the alternate transponder unit, for example. Then, the transfer path setting unit 42 updates the number of the slot responding to an information collection request, which corresponds to the slot number "1" from "3" to "5" within the transfer path table 43.

Notably, the transfer path setting unit 42 may detect a malfunction of a transponder unit and may perform the processing above before the transponder unit is detached.

The cases where a transponder unit is to be added and deleted have been described above. Finally, variation examples will be described where a setting request and a control instruction are discriminated, and the transponder unit to be the aggregation end of responses to a setting request and the transponder unit to be the aggregation end of responses to a control instruction are set separately. Like the description based on the comparison between communication which has been performed ordinary operation and communication which is performed in this embodiment, the central monitoring unit 40 and transponder units 50A1 to 50A3 are selected among the units illustrated in FIG. 2, and the four units will be described.

First of all, referring back to FIG. 14, the transponder unit 50A2 and the transponder unit 50A3 return responses through the path via the transponder unit 50A1 (R50 and R51) if a setting request or control instruction transmitted by the central monitoring unit 40 is received (C50 and C51) in the FIG. 14.

Describing the variation example with reference to the FIG. 14, the transponder unit 50A2 and the transponder unit 50A3 return responses through the path via the transponder unit 50A1 (R50 and R51) only if a setting request is received (C50 and C51). Notably, the transponder unit 50A1 returns a response to the central monitoring unit 40 directly (R52) if a setting request is received (C52).

Figure 21:
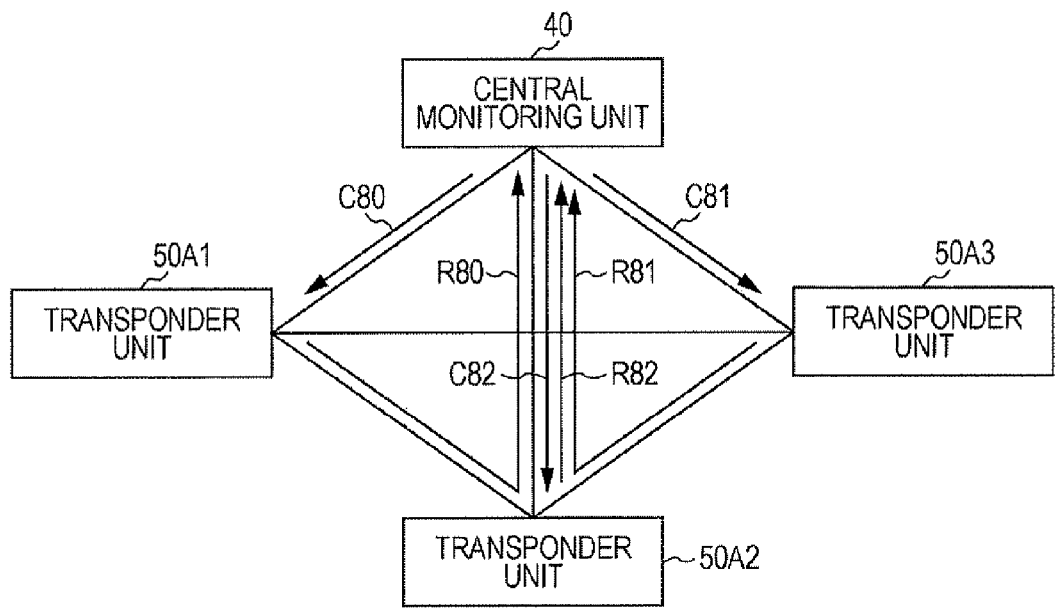
FIG. 21 is a diagram for illustrating another path of the response to a control instruction.

Then, as illustrated in FIG. 21, the transponder unit 50A1 and the transponder unit 50A3 return responses through the path via the transponder unit 50A2 (R80 and R81) only if a control instruction is received (C80 and C81). Notably, the transponder unit 50A2 returns a response to the central monitoring unit 40 directly (R82) if a control instruction is received (C82).

In this way, the communication path between the transponder unit 50A1 and the central monitoring unit 40 may be used for responding to a setting request, and the communication path between the transponder unit 50A2 and the central monitoring unit 40 may be used for responding to a control instruction. In those cases, the transponder unit 50A3 responses to an information collection request transmitted to the central monitoring unit 40 on behalf of the transponder unit.

Figure 22:
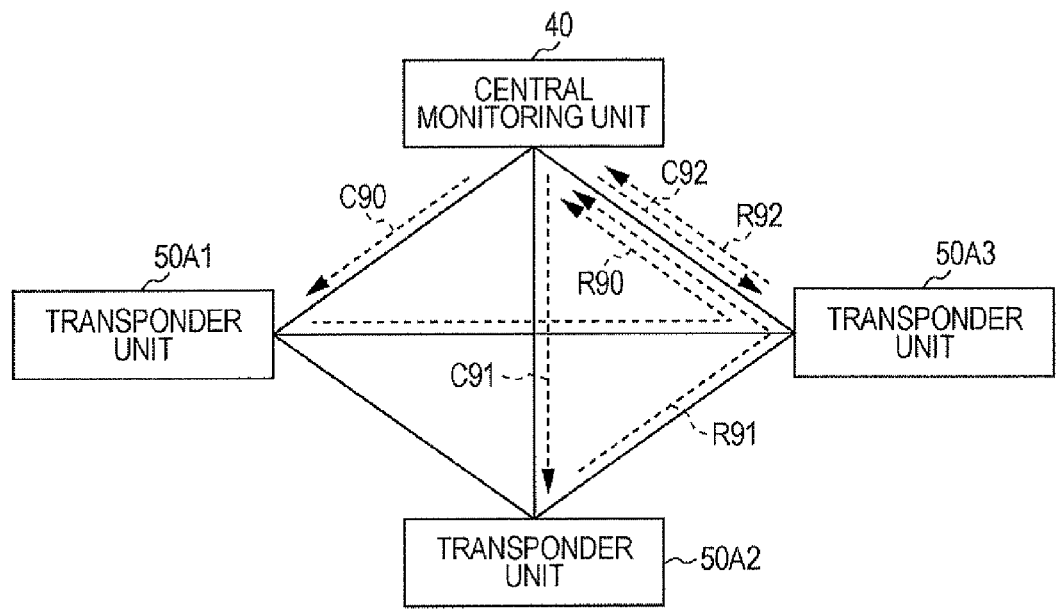
FIG. 22 is a diagram for illustrating another path of the response to an information collection request.

In other words, as illustrated in FIG. 22, if the transponder unit 50A1 receives the information collection request transmitted by the central monitoring unit 40 (C90), the transponder unit 50A1 returns the response through the path via the transponder unit 50A3 (R90). If the transponder unit 50A2 receives the information collection request transmitted by the central monitoring unit 40 (C91), the transponder unit 50A2 returns the response through the path via the transponder unit 50A3 (R91). Notably, if the transponder unit 50A3 receives the information collection request (C92), the transponder unit 50A3 directly returns the response to the central monitoring unit 40 (R92).

Advantages of Embodiment 1

As described above, according to the embodiment 1, a communication path among transponder units using the mesh line is used to set an arbitrary transponder unit as an aggregation end for responses with high priority and causes a different transponder unit to carry out the response (with low priority) regarding information collection on behalf of the transponder unit. Thus, the efficiency of the communication is increased between the monitoring unit within an optical transmission apparatus and the transponder units, and the delays in communication with high priority can be prevented. According to the embodiment 1, because a transfer path is set automatically, a manager of the system can save the trouble.

According to the embodiment 1, because the reset of the transfer path can be performed automatically even in a case where a transponder unit is added or deleted or a transponder unit has a malfunction, a manager therefore can save the trouble.

According to the embodiment 1, multiple responses can be set as ones with high priority.

Embodiment 2

Having described the case according to the embodiment 1 that the central monitoring unit 40 sets an aggregation transponder unit and an alternate transponder unit, a case according to Embodiment 2 will be described where one transponder unit on behalf of multiple transponder units sets an aggregation transponder unit and an alternate transponder unit.

Figure 23:
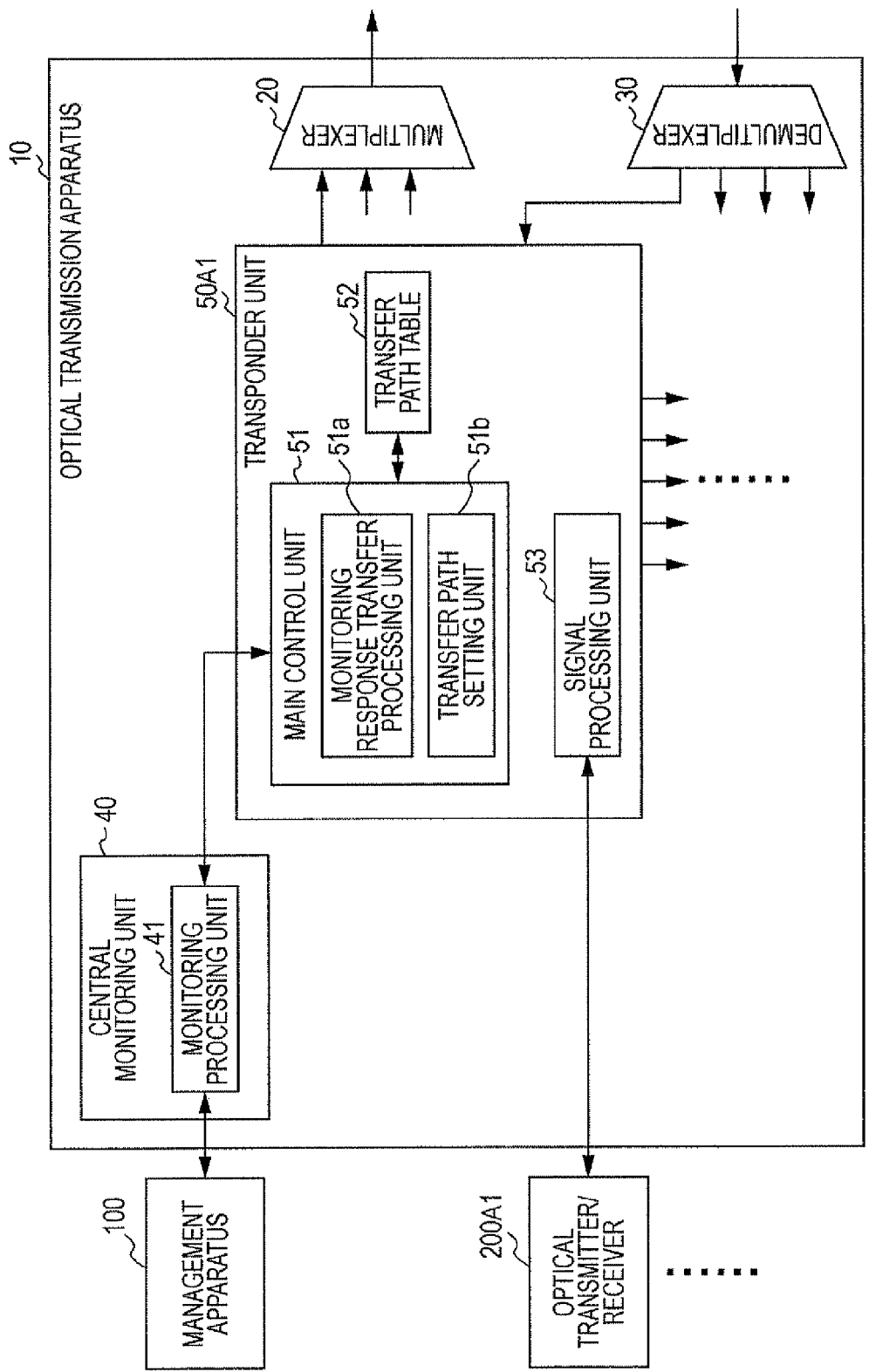
FIG. 23 is a diagram for illustrating a configuration of the optical transmission apparatus according to Embodiment 2.

FIG. 23 is a diagram for explaining a configuration of the optical transmission apparatus according to Embodiment 2. The same descriptions on the components as the descriptions on the processing and functions according to Embodiment 1 will be omitted herein. A transponder unit 50A1 will be described as a representative of multiple transponder units, and the processing and functions of the components are common to all of the transponder units.

First of all, a transfer path table 52 is a table which stores similar information on the transfer path table 43 of the central monitoring unit 40 according to Embodiment 1. In other words, as shown in FIG. 3, the transfer path table 52 stores the slot numbers for the slots of the optical transmission apparatus 10 in advance. Moreover, the transfer path table 52 stores a correspondence relationship between the number of the slot responding to a setting request or control instruction and the numbers of the slots responding to an information collection request. The transfer path table 52 stores information during processing by a transfer path setting unit 51b, which will be described later.

A main control unit 51 includes the transfer path setting unit 51b unlike Embodiment 1 in addition to the monitoring response transfer processing unit 51a.

The transfer path setting unit 51b checks which transponder units are installed in slots upon powering on the optical transmission apparatus 10.

Describing more specifically with reference to FIG. 2, the transfer path setting unit 51b recognizes that mesh configurable transponder units are installed in Slots 3, 5, 7, 13, 15, 17 and 19 if it can communicate with transponder units 50A2 to 50A8. The transfer path setting unit of each of the other transponder units performs the same processing.

The following processing is processing to be performed by the transfer path setting unit that has recognized that the own unit is installed in the slot with a lowest slot number.

Referring back to FIG. 2, because the own unit is installed in Slot 1 with the lowest slot number, the transfer path setting unit 51b determines the own unit as an aggregation transponder unit. The transfer path setting unit 51b further stores the slot number "1" of the slot having the own unit to the number of the slot responding to a setting request or control instruction, which corresponds to the slot number of the slot having a mesh configurable transponder unit, within the transfer path table 52.

Moreover, the transfer path setting unit 51b determines the transponder unit 50A2 installed to Slot 3 with the next lowest slot number as the transponder unit that responds to an information collection request on behalf of the own unit. The transfer path setting unit 51b stores "3" to the number of the slot responding to an information collection request, which corresponds to the slot number of the slot having the own unit, within the transfer path table 52. Furthermore, the transfer path setting unit 51b stores an identical slot number in accordance with a preset slot number at the numbers of the slots responding to an information collection request in accordance with the slot number of the slot having the different transponder unit within the transfer path table 52.

Then, the transfer path setting unit 51b transmits information stored on the transfer path table 52 to the different transponder unit. The transfer path setting unit of the different transponder unit stores the received information on the transfer path table.

On the basis of the settings of the transfer path setting unit 51b, the monitoring response transfer processing unit 51a responds to a setting request, control instruction or information collection request transmitted from the central monitoring unit 41. In referring to the transfer path table 52, the monitoring response transfer processing unit 51a refers to the information corresponding to the slot number of the slot having the own unit.

By the way, like Embodiment 1, a transponder unit may be detached or inserted, which may change the configuration of the transponder units, when the optical transmission apparatus 10 is in operation. Even in this case, the transponder unit installed in the slot with the lowest slot number may become a representative to update the transfer path table and transmit the updated information to other transponder units, as in the processing in the transfer path setting unit 42 described according to Embodiment 1.

Advantages of Embodiment 2

As described above, according to Embodiment 2, because a transponder unit itself can automatically set and reset the transfer path, the processing load on the central monitoring unit can be reduced.

Industrial Applicability

As described above, the optical transmission apparatus and management method for an optical transmission apparatus according to the present invention can increase the efficiency of the communication required for operations by the optical transmission apparatus, which is communication between the monitoring unit and transponder units within the apparatus, and prevent the delays in communication with high priority.

The present embodiments are made in order to solve the problems of the aforesaid conventional technology and achieve objects, and the object of the present invention is to provide an optical transmission apparatus and a management method for an optical transmission apparatus, which can increase the efficiency of communication between a monitoring unit and transponder units within the optical transmission apparatus and prevent delays in communication with high priority.

General Advantage

The disclosed apparatus uses a communication path among transponder units using a mesh line, sets an arbitrary transponder unit as an aggregation end of responses with high priority and causes a different transponder unit to carry out the response (with low priority) for information collection on behalf of the transponder unit. This can provide advantages that the efficiency of the communication between a monitoring unit and transponder units within the optical transmission apparatus increases and that delays in communication with high priority can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical transmission apparatus for wavelength multiplexing/demultiplexing optical signals, the optical transmission apparatus comprising:
    a network;
    a plurality of transponders coupled with the network, each of the plurality of transponders having a response transfer processing unit for communicating between the other transponders via the network;
    a monitor coupled with each of the plurality of transponders, respectively, the monitor for monitoring the plurality of transponders and for sending a first request and a second request to the plurality of transponders;
    a multiplexer coupled with the plurality of transponders, the multiplexer for multiplexing signals from the plurality of transponders; and
    a demultiplexer coupled with the plurality of transponders, the demultiplexer for providing demultiplexed signals to each of the plurality of transponders;
    wherein a first transponder of the plurality of transponders responds an answer to the monitor via the network when the first transponder receives the first request, a second transponder of the plurality of transponders responds an answer through the first transponder to the monitor via the network when the second transponder receives the first request, and the first transponder responds an answer through the second transponder to the monitor via the network when the first transponder receives the second request.

2. The optical transmission apparatus of claim 1, wherein:
    the network is a mesh network having transmitting paths coupling with the plurality of transponders and the monitor, respectively; and
    the monitor has a path setting part for setting a transmitting path for the response transfer processing unit of the plurality of transponders.

3. The optical transmission apparatus of claim 1, wherein:
    the network is a mesh network having paths coupling with the plurality of transponders and the monitor, respectively; and
    the plurality of transponders have a path setting part for setting a transmitting path for the response transfer processing unit of the plurality of transponders.

4. The optical transmission apparatus of claim 2, wherein the path setting part sets the paths when the path setting part detects a malfunction operation, a new transponder, or taking away a transponder.

5. The optical transmission apparatus of claim 3, wherein the path setting part sets the paths when the path setting part detects a malfunction operation, a new transponder, or taking away a transponder.

6. The optical transmission apparatus of claim 1, wherein the second transponder responds an answer by the use of another transponder via the network when the second transponder receives the second request from the monitor.

7. The optical transmission apparatus of claim 1, wherein the monitor collects a response indicating process completion from the transponder by the use of the first request.

8. The optical transmission apparatus of claim 1, wherein the monitor collects a response indicating information of the transponder by the use of the second request.

9. A method for controlling an optical transmission apparatus for wavelength multiplexing/demultiplexing optical signals, the optical transmission apparatus including: a network; a plurality of transponders coupled with the network, each of the plurality of transponders having a response transfer processing unit for communicating between the other transponders via the network; a monitor coupled with each of the plurality of transponders, respectively, the monitor for monitoring the plurality of transponders and for sending a first request and a second request to the plurality of transponders; a multiplexer coupled with the plurality of transponders, the multiplexer for multiplexing signals from the plurality of transponders; and a demultiplexer coupled with the plurality of transponders, the demultiplexer for providing demultiplexed signals to each of the plurality of transponders; the method comprising;
    responding an answer from a first transponder of the plurality of transponders to the monitor via the network when the first transponder receives the first request;
    responding an answer from a second transponder of the plurality of transponders through the first transponder to the monitor via the network when the second transponder receives the first request; and
    responding an answer from the first transponder through the second transponder to the monitor via the network when the first transponder receives the second request.

10. An apparatus comprising:
    a plurality of transponders
        to transmit a plurality of optical signals, respectively, which are thereafter wavelength division multiplexed together by a multiplexer and transmitted from the multiplexer as a wavelength division multiplexed signal, and
        to receive a plurality of optical signals, respectively, which have been demultiplexed by a demultiplexer from a wavelength division multiplexed signal received by the demultiplexer; and a monitor to monitor the plurality of transponders, wherein
the monitor sends a first request to a first transponder and a second transponder of the plurality of transponders, the first transponder responds with an answer to the monitor when the first transponder receives the first request, and the second transponder responds with an answer to the monitor through the first transponder when the second transponder receives the first request, and
the monitor sends a second request to the first transponder, and the first transponder responds with an answer to the monitor through the second transponder when the first transponder receives the second request.

11. The apparatus of claim 10, wherein the first request is a request to collect information from the first and second transponders, and the second request is a request to collect information from the first transponder.

\* \* \* \* \*

UNITED STATES PATENT AND TRADEMARK OFFICE
CERTIFICATE OF CORRECTION

PATENT NO. : 8,190,022 B2
APPLICATION NO. : 12/338328
DATED : May 29, 2012
INVENTOR(S) : Takuma Shoji It is certified that error appears in the above-identified patent and that said Letters Patent is hereby corrected as shown below:

On the Title Page Col. 2 (Abstract), Line 7, Delete "transponder;" and insert -- transponder. --, therefor.

Signed and Sealed this
Eighteenth Day of December, 2012

David J. Kappos
*Director of the United States Patent and Trademark Office*